Patented Feb. 28, 1950

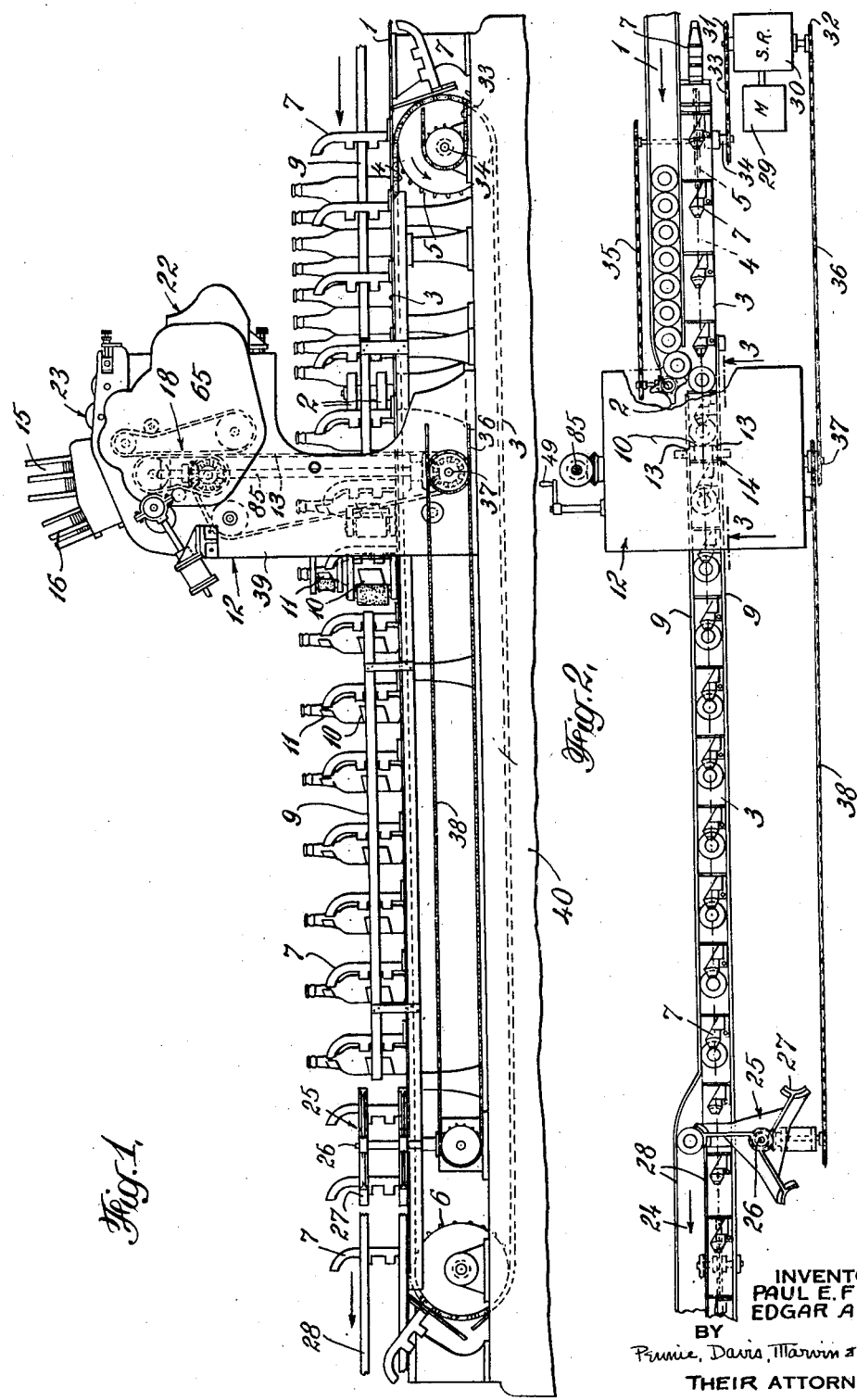

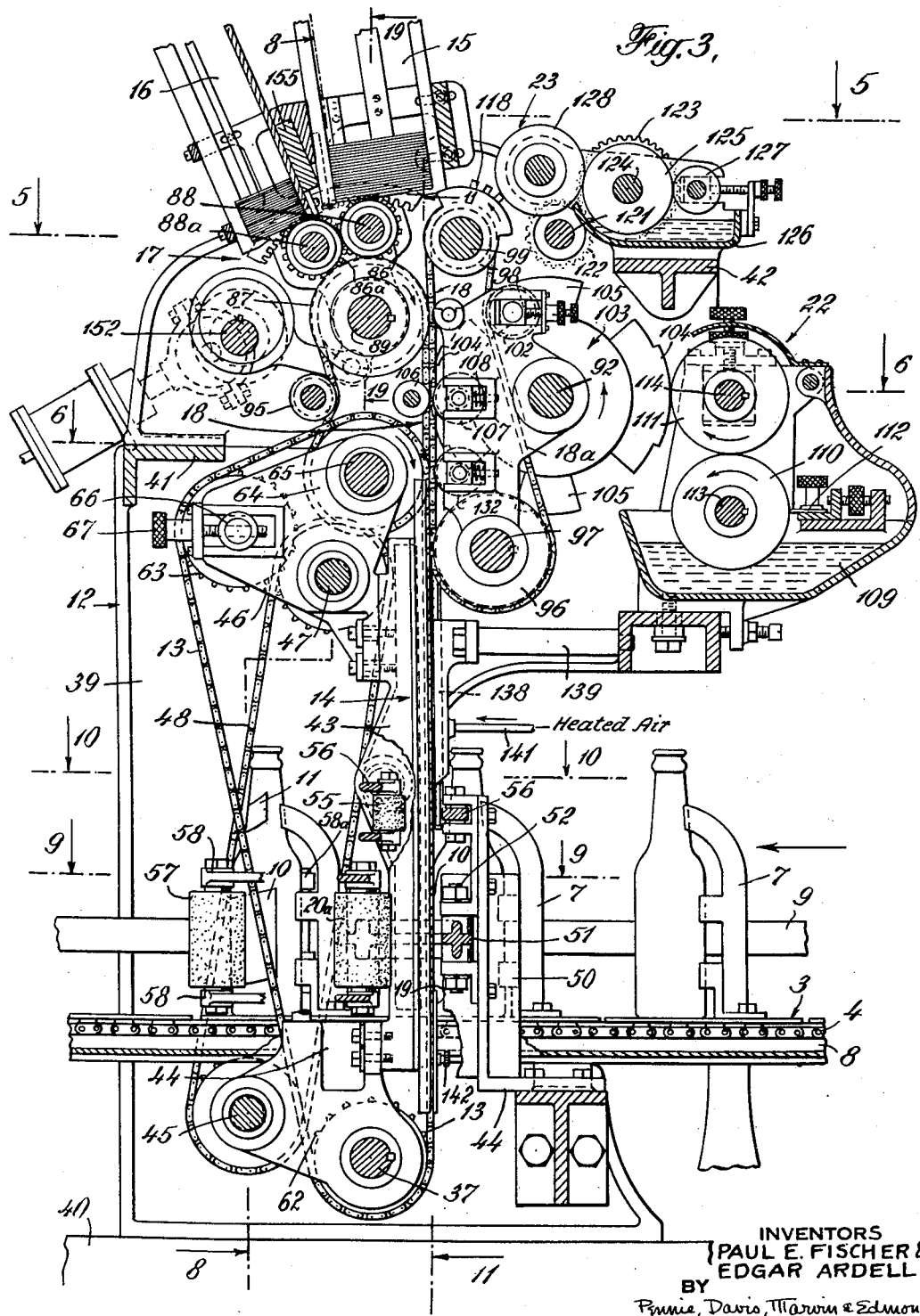

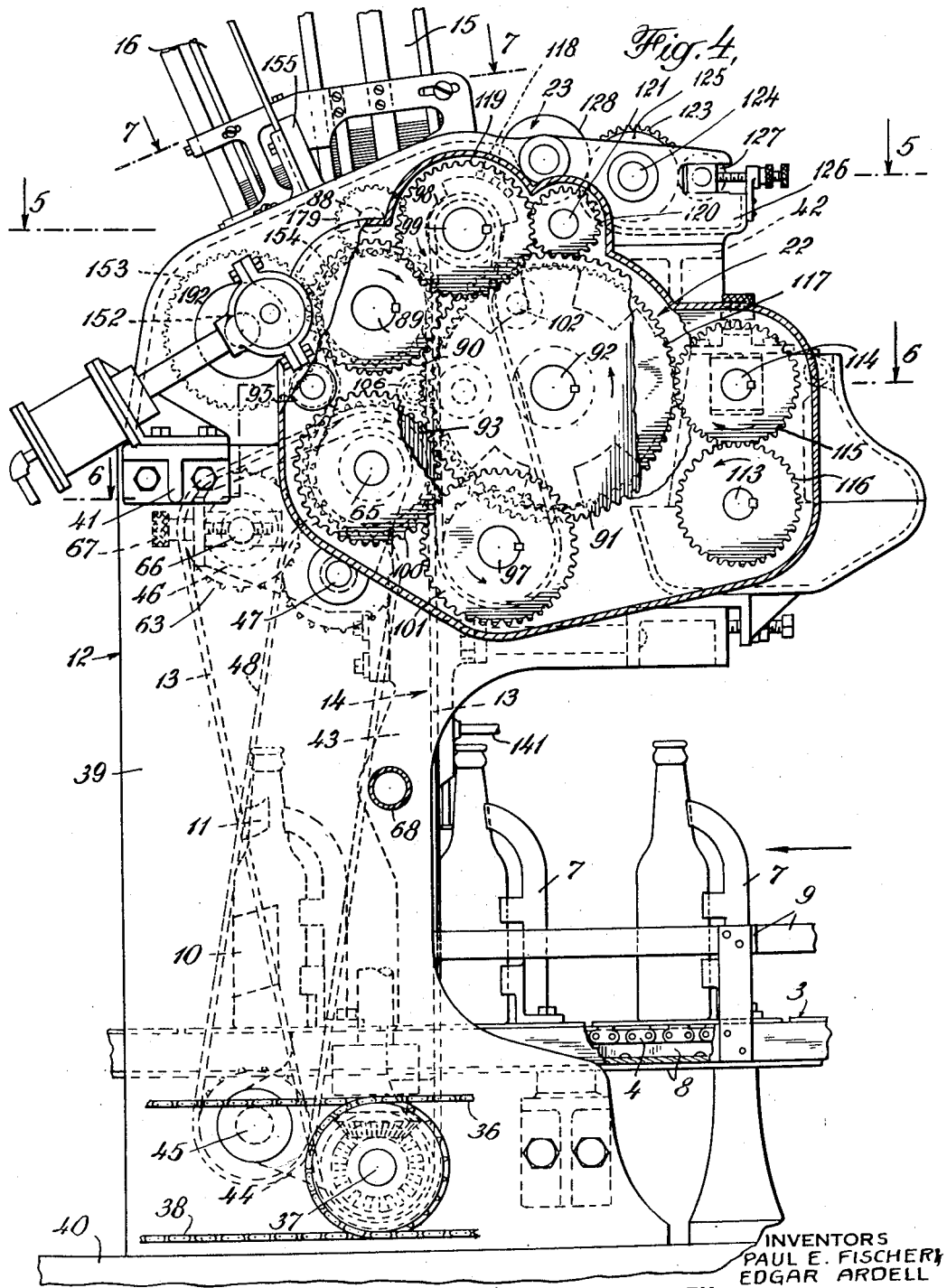

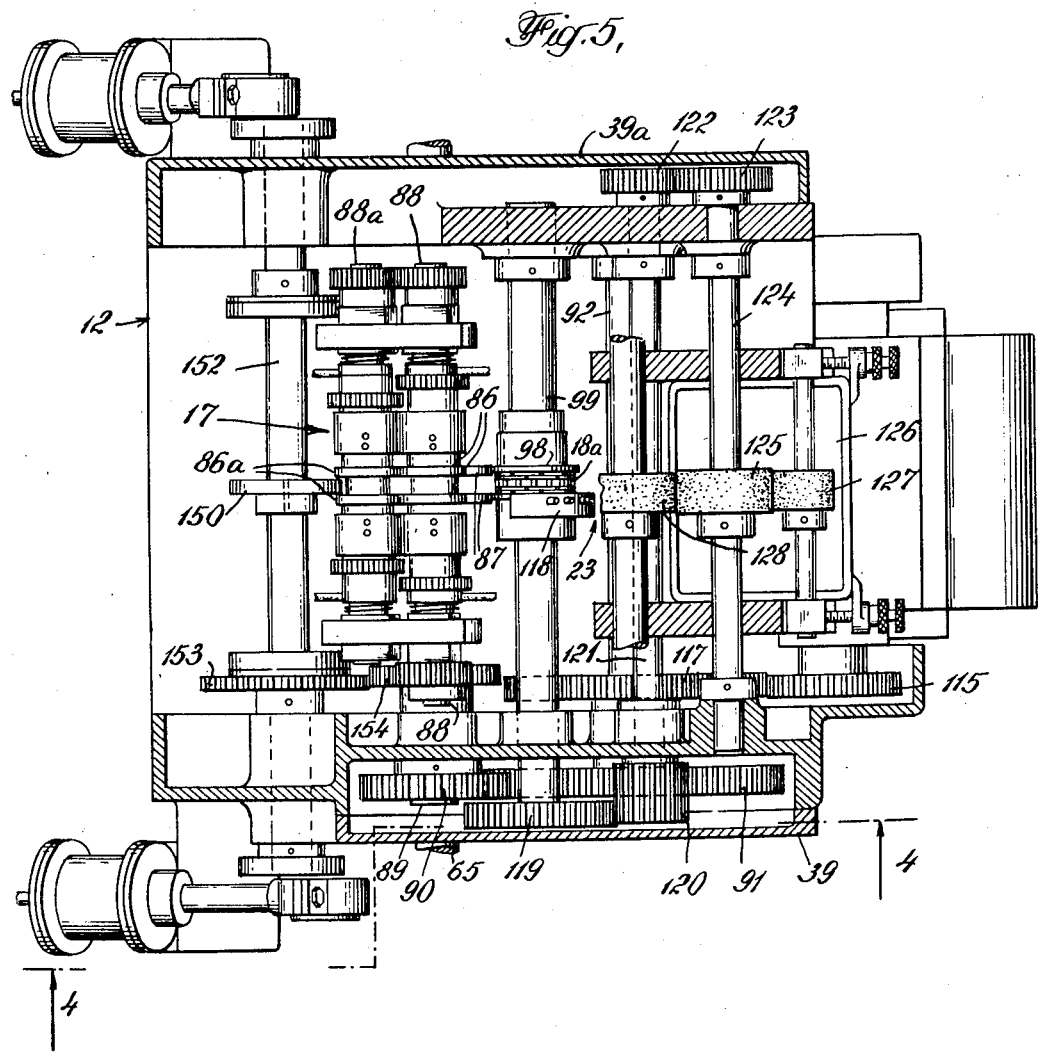

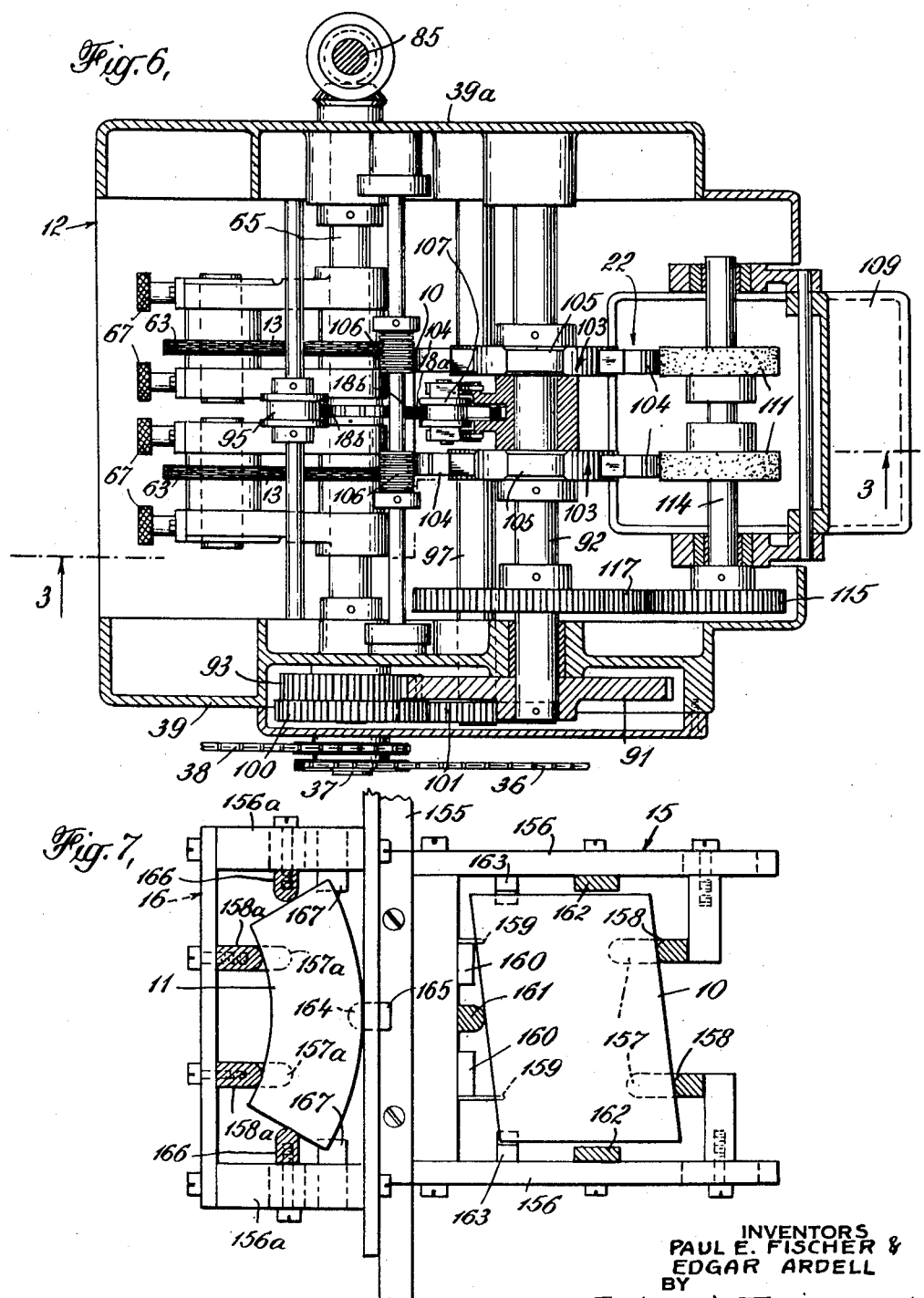

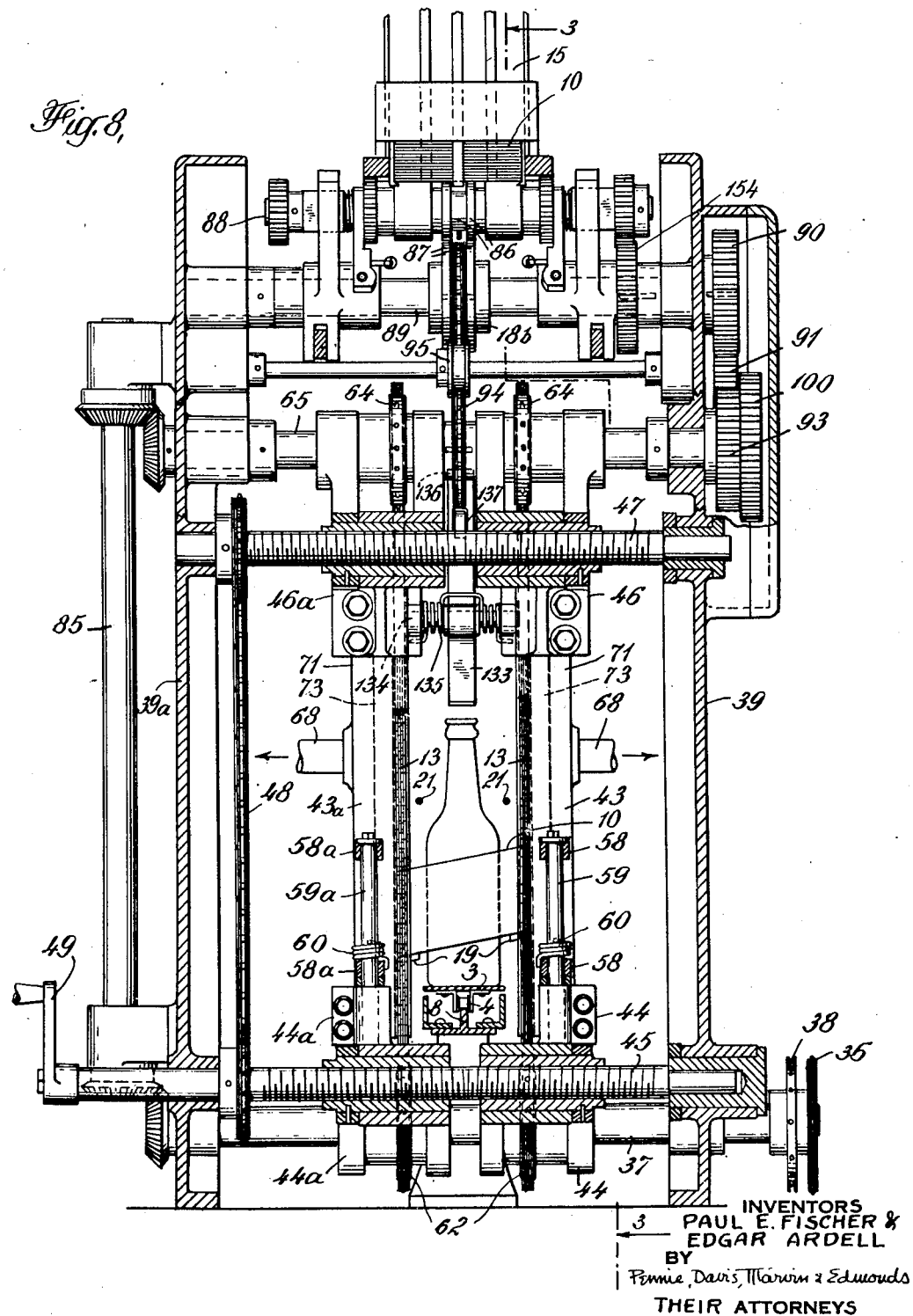

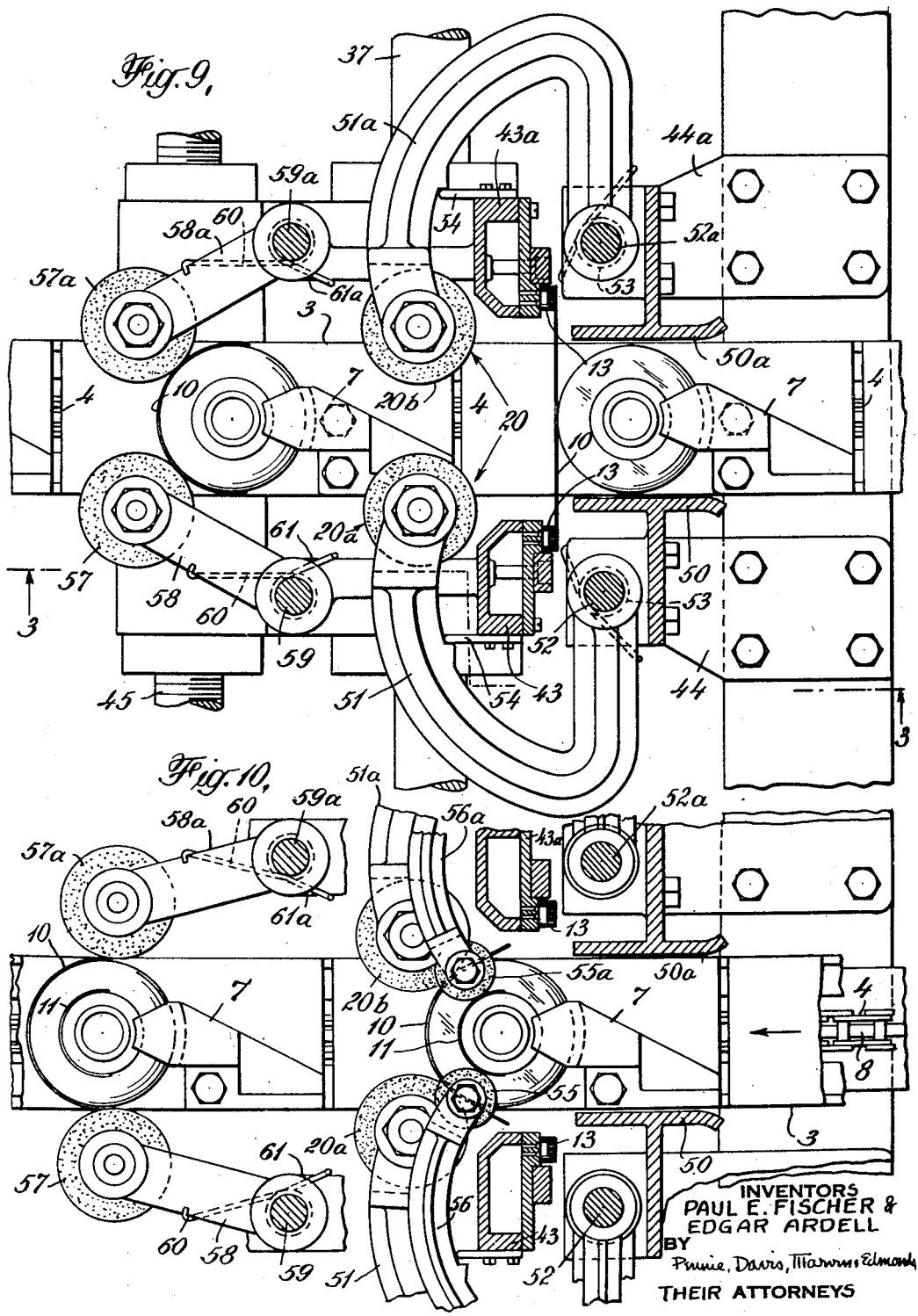

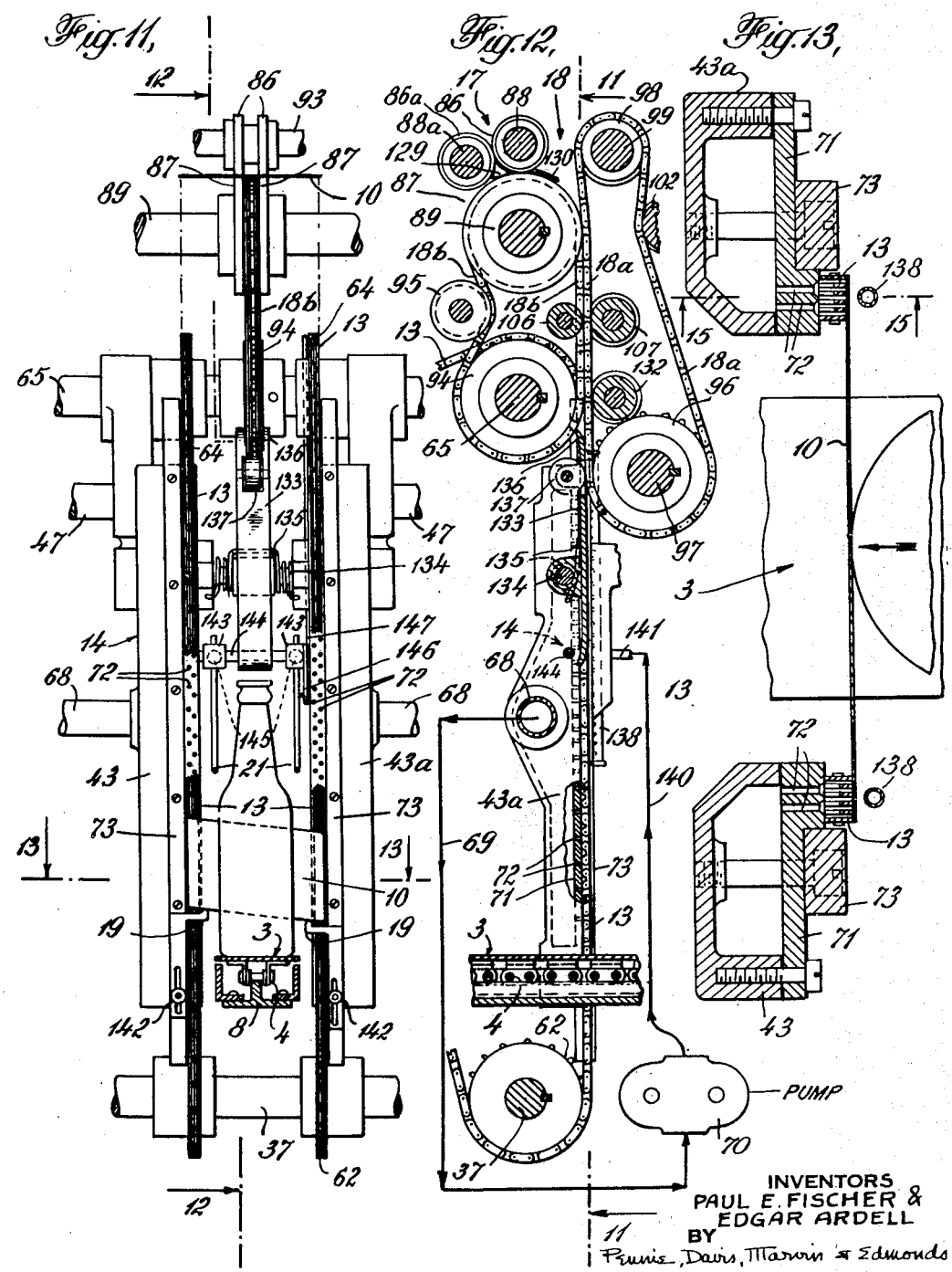

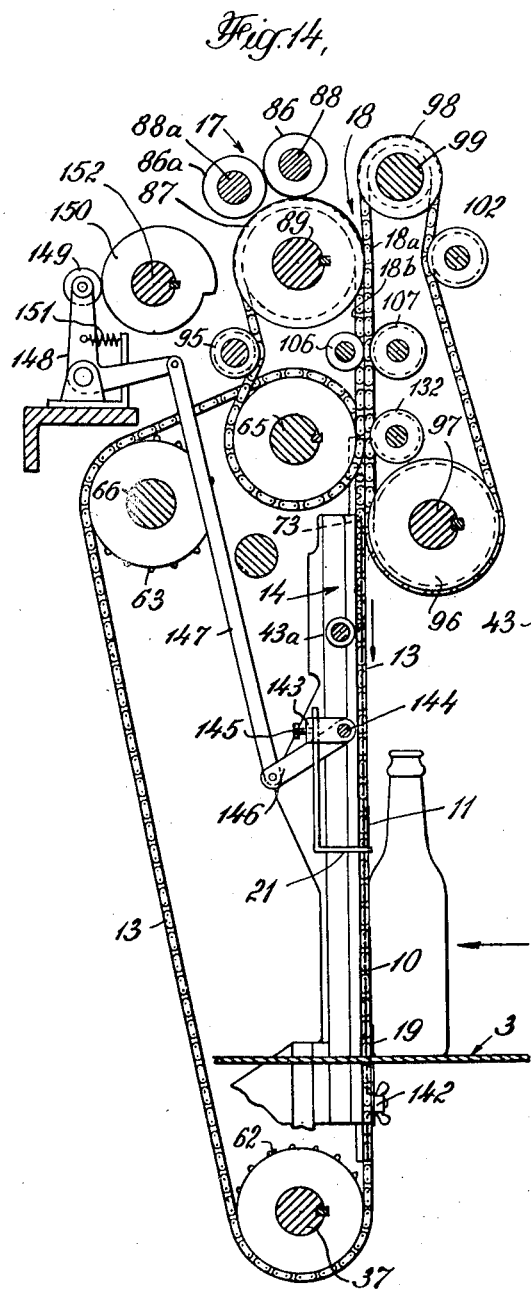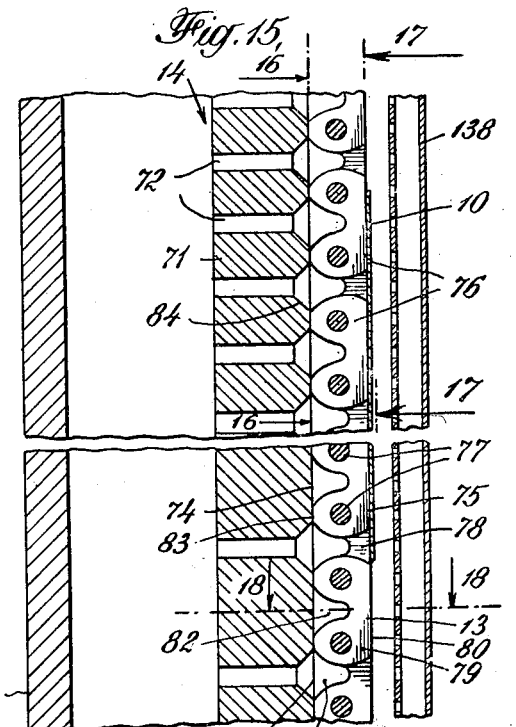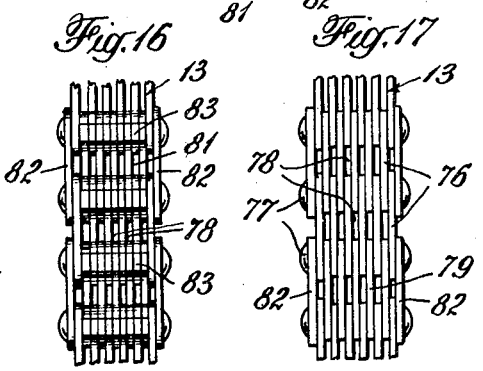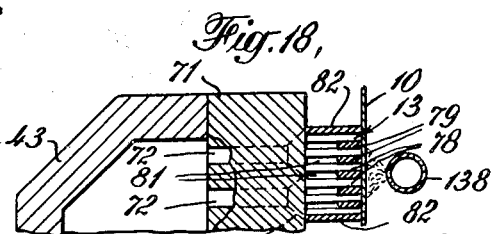

2,498,667

UNITED STATES PATENT OFFICE 2,498,667

ARTICLE LABELING MACHINE

Paul E. Fischer, Portland, and Edgar Ardell, Middletown, Conn., assignors, by mesne assignments, to Hartford-Empire Company, Hartford, Conn., a corporation of Delaware Application July 31, 1945, Serial No. 608,050

22 Claims. (Cl. 216—13)

This invention relates to machines for conveying and affixing to articles of various kinds sheets, including those of thin pliable material, and it relates particularly to apparatus for placing labels, stamps, and the like, on articles such as bottles, cans, and other containers. More specifically, the invention relates to that type of article-labeling machine in which the article to which the label is to be affixed is propelled on a conveyor, and the label, to which suitable adhesive has been applied, is held stretched in the path of the article so that as the article moves forward it is brought into contact with the back of the label carrying the adhesive, suitable means being provided for thereafter smoothing the label against the surface of the article.

The present invention aims to provide an improved apparatus for conveying and positioning individual sheets of pliable material.

The invention also aims to provide an improved labeling apparatus of this kind which is reliable in operation and is capable of labeling articles at a rapid rate.

An object of the invention is to provide a labeling apparatus in which the positioning of the labels in the path of the articles is done with a marked degree of accuracy so that articles coming through the apparatus with crooked labels applied to them are substantially eliminated.

Another object of the invention is to provide an apparatus which will apply bias-cut labels as well as straight or rectangular labels.

Another object of the invention is to provide an apparatus which will apply two or more labels to the same article substantially simultaneously.

A further object of the invention is to provide a labeling apparatus which is capable of applying labels that have a tendency to curl or warp, such, for example, as labels made of coated paper, embossed labels and the like.

Another object of the invention is to provide a labeling apparatus which is capable of applying labels that cannot be handled in labeling apparatus as heretofore constructed, such, for example, as labels made of thin and extremely pliable material such as cellophane and other plastic materials.

Another object of the invention is to provide an apparatus for placing labels upon glass containers, such as bottles and jars, in which the containers move through the apparatus continuously at uniform speed.

The invention will be understood by a study of the accompanying drawings, in which the various features of the invention have been embodied in an apparatus for applying two labels, a body label and a neck label, to bottles. In these drawings:

Fig. 1 is a view of the apparatus in side elevation;

Fig. 2 is a plan view of the apparatus;

Fig. 3 is a vertical section of the labeling head or label-applying mechanism taken lengthwise of the apparatus on broken line 3—3 of Figs. 2 and 8 and drawn to an enlarged scale;

Fig. 4, drawn to the same scale as Fig. 3, is a view in side elevation of the label-applying mechanism as shown in Figs. 1 and 3 with parts broken away and shown in section as indicated by the broken line 4—4 of Fig. 5;

Fig. 5, also drawn to the same scale, is a view in horizontal section taken on the plane indicated by broken line 5—5 of Fig. 4;

Fig. 6 is a view similar to Fig. 5 but taken on broken line 6—6 of Fig. 4;

Fig. 7 is a view partly in plan and partly in section taken on line 7—7 of Fig. 4 showing the two label magazines;

Fig. 8 is a transverse vertical section taken on broken line 8—8 of Fig. 3 and drawn to the same scale as that figure;

Fig. 9 is a horizontal section taken on the line 9—9 of Fig. 3 and drawn to a still larger scale (full size);

Fig. 10 is a view similar to Fig. 9 but taken on line 10—10 of Fig. 3;

Fig. 11 is a partial transverse vertical section taken on line 11—11 of Fig. 3 and also Fig. 12, looking in the opposite direction from Fig. 8 to show the label carrier chains;

Fig. 12 is a partial lengthwise vertical section taken on line 12—12 of Fig. 11;

Fig. 13 is a horizontal section taken on line 13—13 of Fig. 11 but drawn to full scale;

Fig. 14 is a view similar to Fig. 12 showing the label positioning stops;

Fig. 15 is a fragmentary section of the suction conveyor drawn to a greatly enlarged scale taken on line 15—15 of Fig. 13;

Figs. 16 and 17 are greatly enlarged fragmentary views of the suction conveyor chains, Fig. 16 being taken on line 16—16 of Fig. 15 and Fig. 17 on line 17—17; and Fig. 18 is a partial transverse section taken on line 18—18 of Fig. 15.

Referring now to the accompanying drawings, the bottles to be labeled are delivered to the apparatus from the filling machine and inspection station on a single line conveyor, such as the belt conveyor 1 (Figs. 1 and 2). They are carried forward by this conveyor and collect in solid or close formation with the foremost bottle in engagement with a spacing mechanism which may be in a form of a positively driven star wheel mechanism 2. This mechanism feeds the bottles one at a time onto a plate conveyor 3 which travels from right to left, as shown in Figs. 1 and 2, continuously at a uniform speed or velocity.

Conveyor 3 is composed of metal plates, better shown in Fig. 9, closely spaced, and supported upon an endless chain 4 trained over a driving sprocket 5 at the right-hand end of the apparatus and an idler sprocket 6 at the left-hand end. Fixed in equally spaced relation on conveyor 3 are bottle pushers 7 arranged to engage both the body and the neck of a bottle. The star wheel mechanism 2 feeds a bottle in front of each of these pusher members 7. The upper reach of conveyor 3 is maintained horizontal by means of a rigid rail member 8 (Figs. 3, 4 and 11) supported on the horizontal framework of the apparatus. Stationary guide rails 9 are provided along each side of conveyor 3.

The bottles, as they are carried along by the continuously moving conveyor 3, receive each a body label 10 and a neck label 11 substantially simultaneously as the bottles pass the labeling head, indicated generally by reference numeral 12. One of each of these labels is carried downwardly into the path of each bottle on a pair of narrow suction chains 13 which constitute a part of a suction conveyor indicated generally by reference numeral 14.

The body labels are contained in a label magazine 15 and neck labels in a magazine 16 at the top of labeling head 12. They are removed from the bottoms of these magazines by label-feeding mechanism, indicated generally by numeral 17 (Fig. 3) which delivers two labels, one from each magazine successively, to a pair of coacting transfer chains, indicated generally by reference numeral 18 (Figs. 11, 12 and 14), and comprising front and rear chains 18a, 18b, which coact back-to-back along the vertical center lines of the labels to clamp the labels between them and convey them downward to the upper end of suction conveyor chains 13. Chains 13 are appropriately spaced apart to allow the bottles on conveyor 3 to pass between them and to engage the marginal portions of the opposite sides of the labels. The front surfaces of the labels are pressed by suction against the outer faces of the chains, which, as they descend hold the labels stretched between them in the path of the bottle.

Each body label 10 as it reaches a position an appropriate distance above the bottom of the bottle standing on conveyor 3 engages a pair of positioning stop members 19 which arrest the downward movement of the label. The label is held at this point by the stops, chains 13 sliding along the surface of the label until the bottle meets it, as shown in Figs. 2 and 8.

The surface of the bottle meets the back surface of the label to the side margins of which adhesive has been applied during the travel of the label from magazine 15. To hold the label in position and quickly bring its gummed margins against the surface of the bottle, label-retaining mechanism, indicated generally by numeral 20, is provided. This mechanism may comprise a pair of rollers 20a and 20b appropriately mounted to yield resiliently and swing outwardly as the bottle moves forward, forcing the sides of the label into contact with the bottle, as the margins of the label are pulled away from the two suction carrier chains 13.

The neck label which closely follows the body label on the suction carrier chains 13 is applied in a similar manner, its bottom edge being engaged by two retractable stop members 21 (Figs. 14 and 11). Stop members 21 are projected into the path of the neck label 11 after the body label 10 has passed these stops and are then retracted to permit the body label 10 for the next bottle to be carried down to the stop members 19. Like the body labels, the neck labels also receive an application of adhesive before they reach the stop members 21.

The adhesive is applied to both body and neck labels while they are being carried downwardly by transfer chains 18 (which hold the labels at their center lines), by means of adhesive-applying mechanism indicated generally by numeral 22 which applies stripes of gum along the margins.

It is sometimes desirable to apply to the body label or the neck label, or both, a code marking to identify the inspector, or for some other purpose. Such marking may be applied by means of a code-marking mechanism, indicated generally by numeral 23, and arranged to mark the labels while they are still held by the label-feed mechanism 17.

From the above description, it will be understood that the bottles are completely labeled when they emerge from the labeling head 12 as they are carried toward the left by conveyor 3.

The bottles are removed from conveyor 3 onto a transporting conveyor 24 by means of a rotary device 25 which rotates on a vertical shaft 26 and which is provided with three pairs of upper and lower arms 27 that engage the bottle near the bottom and also near the upper part of its body. Device 25 is rotated in timed relation to the conveyor 3 and operates to sweep the individual bottles cross-wise from conveyor 3 onto conveyor 24. This conveyor is provided with the usual side guides 28 and serves to carry the bottles to the next operation, for example, the packing apparatus, which places the bottles in shipping cases.

Having thus described the general arrangement and operation of the apparatus of the invention, its various parts will now be set forth in detail.

The apparatus may be driven by means of any suitable power source, such, for example, as an electric motor 29, which is operatively connected to a speed reducing gear 30. The slow speed shaft of this speed reducer 30 has two sprockets 31 and 32. Sprocket 31 is connected by means of an endless chain 33 to drive shaft 34 for drive sprocket 5 of conveyor 3. The star wheel bottle separating and feeding mechanism 2 is driven by means of an endless chain 35 trained around sprockets arranged respectively on the star wheel mechanism and shaft 34.

The other sprocket 32 of speed reducer 30 is connected by means of a chain 36 to rotate a horizontal shaft 37 at the lower part of labeling head 12 which operates this mechanism after the manner to be described in detail below. Finally, a chain 38 operatively connects shaft 37 with rotary bottle removing device 25.

The labeling head or label-applying mechanism 12 comprises two similar upright side frame members 39 and 39a in the form of iron castings. These members rest on the horizontal bed 40 of the apparatus and are tied together at their upper portions by suitable cross members such as indicated at 41 and 42 in Fig. 3. These two frame members 39 and 39a support the various parts of the label-applying mechanism.

The suction conveyor 14 comprises the two suction chains 13 and two suction chambers or boxes 43 and 43a down which these chains travel. It is desirable to be able to adjust the spacing of the suction boxes 43 and 43a to accommodate bottles of different diameters or labels having different lateral dimensions.

To this end, suction boxes 42 and 43a are secured at their lower ends to bracket members 44 and 44a which are slidably supported on cross shaft 37 and an adjacent cross shaft 45. These brackets are in threaded relation with right- and left-hand screw threads on cross shaft 45. At their upper ends suction boxes 43 and 43a are bolted to brackets 46 and 46a which are carried on a second right- and left-hand threaded cross shaft 47. Shafts 45 and 47 are interconnected by means of an endless chain 48 trained around similar sized sprockets fixed on the respective shafts, and shaft 45 is adapted to receive a wrench or hand crank 49 by which the two sections 43 and 43a of the suction conveyor can be adjusted with respect to one another, the two sections remaining always in parallel relation.

Brackets 44 and 44a also support a pair of bottle-positioning side guides 50 and 50a (Fig. 9) which are flared at their forward ends to receive the bottles and which serve accurately to center each bottle laterally with respect to the two label-carrier chains 13 and consequently with respect to the labels.

The label-retaining rollers 20 and 20b are mounted for rotation respectively on the ends of two curved arms 51 and 51a which encircle the two suction heads 43 and 43a and are pivoted at 52 and 52a, respectively, these pivots also being carried by brackets 44 and 44a. Surrounding each of the two pivots 52 and 52a is a coil spring 53. These springs bias arms 51 and 51a in a direction to urge the two rollers 20 and 20a against the front of the label as the bottle pushes the label toward the left, but stops 54 are provided to engage the inside surfaces of arms 51 and 51a so as to hold rollers 20 and 20a out of the path of the bottle pushers 7 to prevent them from striking the rollers should no bottles be present on conveyor 3.

In order to smooth out the neck labels 11, a second pair of label-retaining rollers 55 and 55a (Fig. 10) are provided, these rollers being mounted on a second pair of curved arms 56 and 56a which are mounted on extensions (not shown) fixed to brackets 44 and 44a.

To the left of the retaining rollers 20, 20a there is a pair of label-smoothing or wiping rollers 57 and 57a for the purpose of flattening the labels into smooth contact with the bottles. These rollers are rotatably mounted on arms 58 and 58a pivoted on the opposite sides of conveyor 3 at 59 and 59a. Coil springs 60 are provided on each pivot to bias the arms in a direction to force rollers 57 and 57a into engagement with the side portions of body label 10 as the bottle advances between them. Pivots 59 and 59a are mounted on supports 61 and 61a which are fixed to extensions (not shown) of laterally adjustable bracket members 44 and 44a.

It will be understood that by turning hand crank 49, the apparatus can be quickly adjusted to operate on bottles of different diameters, the turning of this crank causing the lateral adjustment of bottle guides 50 and 50a, label-retaining rollers 20, 20a and 55, 55a, and label-smoothing rollers 57 and 57a, in addition to adjusting the suction boxes or chambers 43 and 43a and the spacing of suction carrier chains 13.

Carrier chains 13 are trained around driving sprockets 62 which are slidably keyed to the continuously driven cross shaft 37, and as may be seen in Fig. 8, are arranged to be moved laterally on this shaft by bracket members 44 and 44a. Following the course of chains 13 in Figs. 3 and 4, they pass over a pair of take-up sprockets 63 and 63a and thence around a pair of idler sprockets 64 which are arranged vertically above driving sprockets 62.

Sprockets 64 are mounted to rotate freely on a cross shaft 65 which is journaled in side frames 39 and 39a vertically above and parallel with the suction carrier chain drive shaft 45. Shaft 65 rotates continuously as will be seen below, but the drive of chains 13, however, is from shaft 45 at the bottom in order to pull chains 13 downwardly over the surfaces of the suction boxes 43 and 43a in a straight vertical path.

Take-up sprockets 63 rotate on a stationary shaft 66 which is adjustable horizontally in guideways in brackets 46 and 46a (Fig. 3) by means of screws 67 to remove slack from carrier chains 13. It will be understood that brackets 46 and 46a are mounted for laterally sliding movement on both of shafts 47 and 65 under control of the right- and left-hand threads on shaft 47.

The suction chambers or boxes 43 and 43a are elongated structures as may be seen in Fig. 8 and are hollow as shown in Fig. 13. They each have a vacuum connection 68 for a flexible tubing (not shown) which forms a part of a vacuum line 69 shown diagrammatically in Fig. 12 and leading to a continuously operated vacuum pump 70 that may be driven from motor 29 or by a separate motor, as desired.

Vacuum chambers or boxes 43 and 43a have removable front cover members 71, and extending along the inner margins of each of these covers there is a suction track having a row of perforations 72 forming a straight track from the top to the bottom and along which the chains 13 travel. The outer surfaces of cover members 71 along these two tracks are finished smooth and flat, preferably by grinding and honing. Guide rails 73 are mounted adjacent the perforated paths 72 to guide the outer sides of chain 13.

Chains 13 are metallic chains composed of links held together by pins (as shown in Figs. 15 to 17 inclusive) and have flat parallel inner and outer faces 74 and 75, respectively, with air passages interconnecting these faces. As shown in Figs. 15 to 17, the links, indicated by numeral 76, are each composed of similar comparatively thin steel laminations held together by pins or rivets 77. The laminations forming adjacent links are staggered with respect to one another so as to leave uniformly distributed air passages 78 passing through each link and interconnecting the two faces 74 and 75.

Each link 76 comprises a series of inner laminations 79 having flat outer surfaces 80 extending from end to end, and inner surfaces which are recessed as shown at 81 in Fig. 15, to receive the sprocket teeth. This inner series of laminations 79 is flanked on each side by a substantially rectangular lamination 82. Laminations 82 serve to close the sides of the tooth-receiving recesses 81, as shown in Figs. 16 and 18, and compel the air to be drawn through the air passages 78 instead of entering the perforations 72 of the suction tracks from the sides of the chain.

In order to separate the various recesses or pockets 82, the inner portions of laminations 79 opposite each of the connecting pins 77 are flattened as indicated at 83. This prevents the suction applied to the inner surface of the label which is in contact with the outer face 75 from being reduced by the flow of air lengthwise of the chain. The width of the flattened faces 83 may be somewhat wider than the diameter of perforations 72, and in order to prevent cut-off of suction during the passage of these faces over the ends of the perforations, the outer ends of the perforations may be countersunk as shown at 84 in Fig. 15. Chain suitable for carrier chains 13 may be manufactured by grinding, and preferably polishing, the inner and outer faces of the so-called silent chain.

Attention is now directed to the feeding mechanism 17, the transfer chains 18, the adhesive-applying mechanism 22, and the code-marking mechanism 23, all of which are located at the upper portion of labeling head 12 between the two side members 39 and 39a, and shown more particularly in Figs. 3 to 6 inclusive, and 8. All of these mechanisms are driven from continuously rotating shaft 65 which in turn is driven from shaft 37 at the bottom of the labeling head by means of a vertical shaft 85 and suitable bevel gearing shown in Fig. 8.

The feeding mechanism 17, which removes body and neck labels 10 and 11 one at a time from their respective magazines 15 and 16 and feeds them in successive pairs or groups to the transfer chains 18, includes body label feed roll 86, neck label feed roll 86a, and a feed roll of larger diameter indicated by numeral 87. These are hard-faced rolls having a central groove corresponding with the width of chain 18b.

Rolls 86 and 86a rotate continuously in yielding contact with each other and in opposite directions, the directions of rotation being indicated by the arrows in Fig. 3. They are keyed respectively on shafts 88 and 88a. Main feed roll 87 is keyed to a shaft 89 mounted parallel to and directly above shaft 65. Body label feed roll 86 coacts with the surface of feed roll 87, these two rolls rotating in opposite direction as shown by the arrows. The remainder of the label feeding mechanism will be described later on.

Shaft 89 which drives main feed roll 87 is driven by means of a gear 90 (Fig. 4) keyed to the end of shaft 89 meshing with a large gear 91 which is keyed on the end of a shaft 92 parallel with shaft 89 which operates the adhesive-applying mechanism to be described later. Large gear 91 in turn is driven by a gear 93 which is keyed near the end of continuously rotating shaft 65 (Fig. 6).

Referring now to the transfer chains 18, chain 18b is driven from a sprocket 94 keyed to shaft 65 (Figs. 8, 12 and 14). The upper end of chain 18b is trained around grooved feed roll 87 of the label feeding mechanism, the groove therein being very slightly deeper than the thickness of the chain (Fig. 8) for a purpose which will appear later. Although grooved feed roll 87 is driven at the same rotative speed as driving sprocket 94, there will be a slight sliding of the chain in the bottom of the groove.

The arrangement of sprockets 94 and grooved feed roll 87 is such that the right-hand reach of chain 18b as shown in Fig. 3, for example, is maintained in a vertical plane which is in alignment with suction conveyor 14 and its suction carrier chains 13. The left-hand reach of chain 18b is engaged by a grooved take-up roller 95 mounted on a cross shaft which is adjustable by suitable mechanism (not shown).

The opposite transfer chain 18a is trained around a driving sprocket 96 at its lower end which is keyed to a shaft 97, and at its upper end passes around a grooved roller 98 which is mounted to rotate freely on a shaft 99. Shaft 97 is positioned below shaft 65 so that the surface of chain 18a will overlap the upper end of suction boxes 43 and 43a of suction conveyor 14 and also the upper portions of suction carrier chains 13. Shaft 99 and roller 98 are positioned to force the left-hand reach of transfer chain 18a into engagement with the outside surface of chain 18b, as may be seen in Figs. 3, 12 and 14. That is to say, there is a slight bend in this reach of chain 18a as it engages chain 18b opposite the center of main feed roll 87.

Shaft 97 which drives chain 18a is rotated from shaft 65 by means of interconnecting gears 100 and 101, gear 100 being mounted outside of gear 93 on shaft 65 (see Fig. 6). A grooved take-up roll 102 (Fig. 3) is arranged in contact with the right-hand reach of chain 18a and may be adjusted by the mechanism shown.

The adhesive-applying mechanism comprises two disks 103 (Fig. 6) which are fixed to rotate with shaft 92 and which carry two pairs of adhesive-applying segments, one pair 104 to apply the adhesive to the body labels and a second and smaller pair 105 to apply the adhesive to the neck labels. As shaft 92 rotates once during the delivery of each two groups of body and neck labels, the segments of each pair are mounted 180° apart as shown in Fig. 3.

It will be understood that as a body label 10 is carried downward by the transfer chains 18a and 18b a set of body label adhesive-applying pad segments 104 contacts the marginal edges of the label as shown in Fig. 6 and applies a strip of adhesive along each edge. In order to support the opposite or front surface of the labels during this process a pair of freely rotating fin rollers 106 are carried on a shaft 107.

Fin rollers 106 consist each of a cylinder of bronze or other suitable material having its surface deeply grooved with a series of equally spaced circular grooves. The reason for this is that should the adhesive-applying segments 104 and 105 be rotated without labels being present between the transfer chains, the adhesive, which is applied to the grooved rollers 106, will enter between the grooves and the amount of adhesive which in turn is smeared on the first few labels to follow will be greatly reduced.

In order to increase the clamping pressure between chains 18a and 18b so as more firmly to support the labels during the application of the adhesive, a horizontal adjustable roller 107 is mounted to engage chain 18a opposite the shaft on which fin rollers 106 are carried (Fig. 6). This shaft serves to support the rear side of chain 18b against the pressure of roller 107. Roller 107 is yieldably urged against chain 18a by means of the yielding mounting shown in Fig. 3, which includes helical spring means 108.

Adhesive is supplied to the surfaces of the applicator pad segments 104 and 105 by the mechanism shown in Figs. 3 and 6. This includes a receptacle 109 for the adhesive, a roller 110 which dips into the adhesive, and a roller 111 which transfers the adhesive to the applicator pads 104 and 105. An adjustable doctor blade 112 is arranged to control the amount of adhesive carried upwardly by roller 110. Rollers 110 and 111 are fixed respectively on parallel horizontal shafts 113 and 114, and these shafts are rotated in opposite directions by intermeshing gears 115 and 116 (Fig. 4), gear 115 being driven by a gear 117 keyed to shaft 92 which carries the applicator sector supporting disks 103.

The code-marking mechanism 23 is mounted above adhesive-applying mechanism 22 and comprises a type-supporting sector 118 (Figs. 3, 4 and 5) which is fixed to shaft 99 close to one side of grooved roller 98 which supports the upper end of transfer chain 18a (Fig. 5). Roller 98 turns loosely on shaft 99, although they may rotate at approximately the same speed.

Shaft 99 is rotated in timed relation to the feeding mechanism 17, and the location of shaft 99 and the radius of type-supporting sector 118 are such that the type carried by this sector transfers an impression onto one extreme side edge of the label on what is its back or inner surface after it is applied to the bottle. This impression being near the edge can be inspected by turning up the edge of the label. The impression is transferred to the label while the label is being carried around the surface of main feed roll 87 and being fed between the two transfer chains 18a and 18b. In other words, the transfer takes place when the three type members shown on sector 118 are approximately 180° from the position shown in the drawings.

In order to drive shaft 99 for type sector 118 it is provided at one end with a gear 119 (Fig. 5) which meshes with a double width smaller gear 120, the teeth of which also engage large gear 91 which drives shaft 92 of the adhesive-applying mechanism. Double width gear 120 is keyed to the end of a small shaft 121, and fixed on the opposite end of this shaft there is a second gear 122.

Gear 122 drives a gear 123 fixed to an adjacent and parallel shaft 124. On shaft 124 there is an ink roll 125 which dips into a body of ink contained in a receptacle 126. Roll 125 frictionally drives an adjacent ink spreading roll 127 and an ink transfer roll 128, the latter serving to transfer ink from roll 125 to the type carried by sector 118.

As the respective body labels 10 and 11 are fed from their respective magazines 15 and 16 by feed mechanism 17, they are fed one at a time between the coacting feed rolls 86 and 86a towards main feed roll 87. In order to direct the leading edge of each label toward this roll, a stationary triangular-shaped guide member 129 (Fig. 12) is provided. This member has a curved guiding edge at its right-hand surface and is supported on the frame by means of a rod 130, the lower end of which is held by nuts threaded thereon. The upper point of guide 129 is disposed within the groove in feed roll 86a and hence is always below the surface of this feed roll so that it is impossible for a label to move otherwise than to the right around the lower side of feed roll 86.

As the labels pass between feed roll 86 and feed roll 87 they are deflected downwardly by a second curved guide which directs the labels along the surface of feed roll 87 so that they will pass smoothly between the upper ends of the two transfer chains 18a and 18b.

After a label has received adhesive during its passage between transfer chains 18a and 18b and as it reaches the position abreast of the center of sprockets 94 and 64 (Figs. 8 and 12), all three of which sprockets are on shaft 65, the marginal front faces of the label come into contact with carrier chain 13 and are guided thereby until the label reaches a point slightly below the center of shaft 97 where these chains pass onto the upper end of suction boxes 43 and 43a. To maintain a firm engagement of the label by chains 18a and 18b as it passes the center of shaft 65, a spring biased, yieldably mounted, grooved roller 132, similar to grooved roller 107, is arranged to bear upon the inner surface of transfer chain 18a.

As the lower edge of the label leaves chain 18b there might be some tendency for it to follow this chain around to the left, and in order to prevent this and to keep the label in contact with chain 18a, a pivoted and spring biased guide bar 133 is provided. This bar is pivoted at 134 and biased by means of coil spring 135, which forces the upper end of the guide bar towards the right, as shown in Fig. 12. Its extreme upper end is bifurcated and curved as indicated at 136 to receive chain 18b and direct the lower edge of the label against chain 18a. In order to prevent the surface of guide bar 133 from contacting the moving chain 18a when no label is present, a roller 137 is mounted at the upper end of guide 133, and its right-hand surface projects sufficiently beyond the surface of guide 133 to hold the surface of the guide out of contact with the chain.

In view of the application of fresh glue to the inner or rear surfaces of the labels, it is desirable to temper this adhesive before the labels are applied to the bottles. To do this a heated air spray is applied to the rear or right-hand surfaces of the labels as they are carried downward by suction conveyor 14. This heated air spray is provided by means of two perforated tubes 138 which extend directly in front of each of the suction carrier chains 13 from a point just above shaft 97 to a point adjacent the stops 21 for the next labels. Spray tubes 138 are supported on a horizontal rod 139 which is fixed to one of the tie members between the side frames 39 and 39a (Fig. 3).

The perforations in spray tubes 138 direct the heated air against the marginal edges of the labels as shown in the magnified views in Figs. 15 and 18, and not only serve to temper the adhesive but also to blow the labels against the carrier chains 13 if there is any tendency to curl. The heated air may be supplied from any suitable source but a convenient source is the outlet of vacuum pump 70 which may be connected by a line 139 (Fig. 12) with the inlets 141 for each of the spray tubes 138.

The stops 19 for body labels 10 are held in adjustably fixed position by means of thumb screws 142. Stops 21 for the neck labels 11 consist of L-shaped rods shown in Fig. 14, the vertical portions of which are received in apertures in lug members 143 (Fig. 11), which are fixed to a short transverse rock shaft 144 carried on the suction boxes 43 and 43a. Set screws 145 clamp the upright portions of stops 21 in these apertures and afford means for adjusting the height of the two stops at the proper elevation to suit the kind of neck label which is to be applied, whether of the straight type or staggered type.

In order to retract stops 21 so as to allow body labels 10 to continue downwardly to the stops 19, and to re-position stops 21 thereafter to engage the neck labels 11, shaft 144 is rocked by the mechanism shown in Fig. 14. For this purpose an arm 146 is fixed to shaft 144 and connected by means of a link 147 to one arm of a bell crank 148 pivoted to the frame of labeling head 12. The other arm of this bell crank carries a roller 149 which is biased against a cam 150 by means of a helical spring 151. Cam 150 is keyed to a shaft 152, shown in Figs. 3 and 5. This shaft is continuously driven from the adjacent shaft 89 by means of a gear 153 which intermeshes with gear 154 keyed to shaft 89 (Fig. 5).

Referring to Fig. 7, the two label magazines 15 and 16 are supported on an elongated rectangular cross bar 155 which extends between the side frame members 39 and 39a at the top. Magazine 15 comprises two approximately horizontal side members 156 which project toward the right from cross bar 155 (Fig. 7). The stack of labels 10 is supported at its right-hand side by two narrow fingers 157 which are spaced from each other and from the side members 156. The upper surfaces of these fingers are flat platform-like surfaces on which the lowermost label of the stack rests. Fingers 157 project from the lower ends of two upright rigid guide bars 158 having their inner edges rounded so as to function with as little friction as possible. Guide bars 158 are independently and adjustably mounted one on each of the opposite side frame members 156, as may be seen in Fig. 7.

The label stack is supported at its opposite or front side on two narrow lips 159 formed on or secured at the bottoms of two supports 160 which are also adjustably mounted on the frame of the magazine by means not shown. Lips 159 are positioned approximately opposite fingers 157 as shown in Fig. 7. A single vertical guide bar 161 is positioned at the center of magazine 15 and extends upwardly to the full height of the magazine. The guiding surface of bar 161 is also rounded like guides 158.

It will be understood that the front or bottom edges of the labels as they appear on the bottles are disposed adjacent guide bar 161, while their rear or top edges are adjacent guides 158. The sides of the labels are guided by upright bars 162 fixed to side frames 156 and also by two narrower guide bars 163 which are positioned adjacent the front corners of the labels and have fingers which project a short distance beneath the bottom of the stack to provide additional support at these points.

It will be understood that guides 158 and supports 160 can be adjusted to enable magazine 15 to receive either the bias cut label, as shown in Fig. 7, or rectangular labels, and also to accommodate labels of different heights. Side frame members 156 may also be adjusted on supporting bar 155 so as to enable the magazine to accommodate labels of different widths.

Magazine 16 for the neck labels is, in general similar in construction to magazine 15. It has a pair of lower side frame members 156a which are fixed to the supporting cross bar 155 and two upright guides 158a for the outer rear or top edge of the labels. These have supporting fingers 157a which support the rear part of the label stack. In magazine 16 the inner forward or lower edges of the labels, which are convex in form, are supported by only a single lip 164 which is secured at the center of the lower edge of a flat plate 165 which forms the inner well of this magazine.

Side members 156a also support upright vertical side guide bars 166 which, because of the varying shape of neck labels 11, are adjustable in position as shown in Fig. 7. The grinding surfaces of these bars are rounded, similar to guides 158 and 158a. The extreme side corners of the neck label stack are supported by means of fingers 167 secured to side members 156a.

By means of the present invention there has been provided an apparatus for the expeditious application of labels, sealing strips and the like to bottles, containers, cans, packages, and other articles. The apparatus operates without special attention and for long periods of time without servicing. The apparatus avoids the use of adhesive in carrying and holding the label in position to be applied to the article. Moreover, various parts of the apparatus such, for example, as the suction conveyor, are capable of fairly general application, their use not being restricted to labeling machines.

It will be understood that many changes in the construction and arrangement of the various parts of the apparatus can be made without departing from the spirit of the invention and the scope thereof as set forth in the appended claims.

We claim:

1. In a labeling machine, a conveyor for the article to be labeled, and means for positioning a label in the path of the propelled article comprising a continuously operating suction conveyor extending at right angles to the plane of said article conveyor and adapted to support a label by contact with the front surface thereof adjacent its opposite side edges, means for delivering a label to the suction conveyor, and means for stopping the movement of the label with respect to the suction conveyor before the article engages the label.

2. In a labeling machine, a conveyor for the article to be labeled, and means for positioning a label in the path of the propelled article comprising a continuously operating suction conveyor extending at right angles to the plane of said article conveyor and adapted to support a label by contact with the front surface thereof adjacent its opposite side edges, means for delivering a label to the suction conveyor, and means for stopping the movement of the label with respect to the suction conveyor at a predetermined distance from said article conveyor to position the label before the article meets it.

3. In a labeling machine, a conveyor for the article to be labeled, and means for positioning a label in the path of the propelled article comprising a vertically extending and continuously operating suction conveyor adapted to support a label by contact with the front surface thereof adjacent its opposite side edges, means for delivering a label to the conveyor, and means for stopping the movement of the label with respect to the suction conveyor comprising two stopping devices one adjacent each side of the suction conveyor to be engaged by the lower edge of the label before the article meets it, said devices being individually vertically adjustable to different heights to cause the label to be applied on the bias.

4. In a labeling machine, a conveyor for the article to be labeled, and means for positioning a plurality of labels in the path of the propelled article for substantially simultaneous application thereto comprising a vertically extending and continuously operating suction conveyor adapted to support the labels by contact with their front surfaces adjacent the opposite side edges thereof, means for successively delivering a plurality of labels to the conveyor, and means for stopping said labels one above another before the article engages the labels.

5. In a labeling machine, a conveyor for the article to be labeled, and means for positioning two labels in the path of the propelled article for substantially simultaneous application thereto comprising a vertically extending and continuously operating suction conveyor adapted to support the labels by contact with their front surfaces adjacent the opposite side edges thereof, means for successively delivering said labels to the conveyor, a retractable stop means to arrest the movement of and position said second label, a stop means for said first label disposed below the retractable stop means, and mechanically operated means for withdrawing the retractable stop means to avoid arresting the first label and to re-position said stop means to arrest said second label.

6. In a labeling machine having a conveyor arranged to positively advance the articles to be labeled in upright uniformly spaced position, a continuously operating suction conveyor adapted to support labels by engagement with their front side margins and carry them into the path of the articles advanced by the article conveyor, and means for stopping the movement of each label to hold the label stationary as the article meets it.

7. In a labeling machine having a conveyor arranged to positively advance the articles to be labeled in upright uniformly spaced position, a continuously operating suction conveyor adapted to support the labels by engagement with their front side margins and carry them into the path of the articles advanced by the article conveyor, means for feeding labels to said suction conveyor, and means for applying adhesive to said labels while they are carried by said feeding means.

8. In a labeling machine having a conveyor arranged to positively advance the articles to be labeled in upright uniformly spaced position, a continuously operating suction conveyor adapted to support the labels by engagement with their front side margins and carry them into the path of the articles advanced by the article conveyor, means for feeding labels to said suction conveyor adapted to grasp the label intermediate its side edges, and means for applying adhesive to the rear surface of the label adjacent its side edges while it is carried by said feeding means.

9. In a labeling machine having a conveyor arranged to positively advance the articles to be labeled in upright uniformly spaced position, a continuously operating suction conveyor adapted to support the labels by engagement with their front side margins and carry them into the path of the articles advanced by the article conveyor, means for feeding labels to said suction conveyor adapted to clampingly engage the front and rear surfaces of the label along the longitudinal center line thereof, and means for applying adhesive along the side margins of the rear surface thereof while the label is supported by said feeding means.

10. In a labeling machine having a conveyor arranged to positively advance the articles to be labeled in upright uniformly spaced position, a continuously operating suction conveyor adapted to support the labels by engagement with their front side margins and carry them into the path of the articles advanced by the article conveyor, means for feeding labels to said suction conveyor comprising a pair of endless bands operating back to back and arranged to clampingly engage the label intermediate its side edges, and means for applying adhesive along the side margins of the rear surface of the label while it is carried by said feeding means.

11. In a labeling machine having a conveyor arranged to positively advance the articles to be labeled in upright uniformly spaced position, a continuously operating suction conveyor adapted to support the labels by engagement with their front side margins and carry them into the path of the articles advanced by the article conveyor, means for feeding the labels to said suction conveyor comprising a magazine containing a stack of labels, separating mechanism for removing the labels one at a time from said magazine and delivering them to said feeding mechanism, and means for applying adhesive to said labels while they are carried by said feeding means.

12. In a labeling machine having a conveyor arranged to positively advance the articles to be labeled in upright uniformly spaced position, a continuously operating suction conveyor adapted to support the labels by engagement with their front side margins and carry them into the path of the articles advanced by the article conveyor, means for feeding labels to said suction conveyor comprising a pair of endless bands operating back to back and arranged to clampingly engage the label intermediate its side edges, a magazine containing a stack of labels, and separating mechanism for removing the labels one at a time from said magazine and delivering them to said feeding mechanism.

13. In a labeling machine having a conveyor arranged to positively advance the articles to be labeled in upright uniformly spaced position, a pair of suction boxes each having a perforated track, said tracks extending upwardly one on each side of said conveyor in a common plane, a pair of perforated endless bands traveling downwardly in coaction with said perforated tracks to form a suction conveyor, means for feeding to said endless bands individual labels with their front side margins against the bands, means to apply adhesive to their backs, and means for operating said feeding means, said conveyor and said endless bands in timed relation to cause labels to be carried into the path of successive articles advanced by said conveyor.

14. In a labeling machine having a conveyor arranged to positively advance the articles to be labeled in upright uniformly spaced position, a pair of suction boxes each having a perforated track, said tracks extending upwardly one on each side of said conveyor in a common plane, a pair of perforated endless bands traveling downwardly in coaction with said perforated tracks to form a suction conveyor adapted to support labels with their front side margins against the bands and carry them into the path of articles advanced successively by the article conveyor, and means for feeding labels to the suction conveyor comprising a pair of endless bands traveling at the same speed and arranged adjacent one another to clamp successive individual labels between them and deliver them to the suction conveyor.

15. In a labeling machine having a conveyor arranged to positively advance the articles to be labeled in upright uniformly spaced position, a pair of suction boxes each having a perforated track, said tracks extending upwardly in a common plane one on each side of said conveyor, a pair of perforated endless bands traveling downwardly in coaction with said perforated tracks to form a suction conveyor adapted to support labels with their front side margins against the bands and carry them into the path of articles advanced successively by the article conveyor, and means for feeding labels to the suction conveyor comprising a pair of endless bands traveling at the same speed and arranged back to back to support the label by frictional engagement with the opposite surfaces thereof, said feeding bands being disposed between the perforated endless bands of the suction conveyor to engage the central portion of a label and deliver the side portions thereof into engagement with the suction conveyor.

16. In a labeling machine having a conveyor arranged to positively advance the articles to be labeled in upright uniformly spaced position, a pair of suction boxes each having a perforated track, said tracks extending upwardly in a common plane one on each side of said conveyor, a pair of perforated endless bands traveling downwardly in coaction with said perforated tracks to form a suction conveyor adapted to support labels with their front side margins against the bands and carry them into the path of articles advanced successively by the article conveyor, and means for delivering labels to the suction conveyor comprising a pair of endless bands traveling at the same speed and coacting with one another in the plane of said suction conveyor to clamp a label between them and convey it to the upper end of the suction conveyor, one of said feeding bands overlapping the suction conveyor and directing the label against the surface thereof.

17. In a labeling machine having a conveyor arranged to positively advance the articles to be labeled in upright uniformly spaced position, a pair of suction boxes each having a perforated track, said tracks extending upwardly one on each side of said conveyor in a common plane, a pair of perforated endless bands traveling downwardly in coaction with said perforated tracks to form a suction conveyor adapted to support labels with their front side margins against the bands and carry them into the path of successive articles advanced by the article conveyor, and stop means to engage the lower edges of said labels to position them with respect to the articles.

18. In a labeling machine having a conveyor arranged to positively advance the articles to be labeled in upright uniformly spaced position, a continuously operating suction conveyor adapted to support labels by engagement with their front side margins and carry them into the path of articles advanced successively by the article conveyor, means for feeding successive pairs of labels to said suction conveyor, each pair to be applied to the same article, means for stopping the movement of the first label of each pair to hold it stationary as the article meets it, retractable means for similarly stopping the second label of each pair, and means for shifting said stop means out of the path of the first label and into the path of the second.

19. In a labeling machine having a conveyor arranged to positively advance the articles to be labeled in upright uniformly spaced position, a pair of suction boxes each having a perforated track, said tracks extending upwardly one on each side of said conveyor in a common plane, a pair of perforated endless bands traveling downwardly in coaction with said perforated tracks to form a suction conveyor adapted to support labels with their front side margins against the bands and carry them into the path of successive articles advanced by the article conveyor, and individually adjustable stop means at each side of said suction conveyor to engage the lower edges of said labels to position them with respect to the articles.

20. In a labeling machine having a conveyor arranged to positively advance the articles to be labeled in upright uniformly spaced position, a pair of suction boxes each having a perforated track, said tracks extending upwardly one on each side of said conveyor in a common plane, a pair of perforated endless bands traveling downwardly in coaction with said perforated tracks to form a suction conveyor adapted to support labels with their front side margins against the bands and carry them into the path of successive articles advanced by the article conveyor, a stop member at each side of said suction conveyor to engage the lower edges of said labels to position them with respect to the articles, and means for supporting said suction boxes, endless bands and stop members in spaced laterally adjustable position.

21. A suction conveyor for sheets of thin material comprising a smooth track, a chain composed of laminated links joined together by pins, the laminations forming air passages between them intermediate adjacent pairs of pins, said chain having smooth parallel opposite faces, means for propelling said chain with one of said faces sliding upon said track, and means including said track for applying suction to said chain.

22. In a machine for positioning sheets of thin pliable material, a suction chamber having a wall containing a narrow line of perforations, an endless band arranged to slide in a path extending along said perforated line, said band having smooth upper and lower surfaces, the lower marginal surfaces being held in substantially airtight relation with said wall, means for feeding sheets of said material successively to the upper surface of said endless band to be carried forward thereby, and a positioning stop member fixed adjacent said band to engage the forward edge of a sheet, and means for disengaging said sheet from said stop member.

PAUL E. FISCHER.
EDGAR ARDELL.

REFERENCES CITED

The following references are of record in the file of this patent:

UNITED STATES PATENTS

| Number | Name | Date |
| --- | --- | --- |
| 1,385,303 | Burghardt | July 19, 1921 |
| 1,709,857 | Kleinberg | Apr. 23, 1929 |
| 1,939,507 | Mason | Dec. 12, 1933 |
| 2,374,838 | Russell | May 1, 1945 |